United States Patent [19]
Higuchi

[11] 3,750,535
[45] Aug. 7, 1973

[54] ROTARY ACTUATOR

[75] Inventor: Yasuo Higuchi, Komaki-shi, Aichi-ken, Japan

[73] Assignee: Kabushiki Kaisha Chukyo Gijutsu Center, Chujoda-Ku, Tokyo, Japan

[22] Filed: Oct. 1, 1971

[21] Appl. No.: 185,762

[30] Foreign Application Priority Data
Oct. 13, 1970 Japan.................................. 45/89342

[52] U.S. Cl. ................................................. 92/121
[51] Int. Cl. ................................................. F01c 9/00
[58] Field of Search...................... 92/120, 121, 125, 92/122, 123, 170; 418/178

[56] References Cited
UNITED STATES PATENTS

| | | | |
|---|---|---|---|
| 3,049,103 | 8/1962 | Dumm | 92/122 |
| 3,379,100 | 4/1968 | Rumsey | 92/120 |
| 2,738,775 | 3/1956 | Smyser | 418/178 |
| 1,965,564 | 7/1934 | Bannister | 92/125 |
| 588,946 | 8/1897 | Bergman | 92/121 |
| 3,066,654 | 12/1962 | Mah | 92/125 |

Primary Examiner—Charles J. Myhre
Assistant Examiner—R. H. Lazarus
Attorney—Kurt Kelman

[57] ABSTRACT

In a rotary actuator, seal material of, for example, synthetic resin, is provided on internal periphery of the cylinder and/or external periphery of the shaft, the seal material is axially compressed by a pair of end covers closing the ends of the cylinder, and square packings are provided to the movable and stationary vanes. The seal material and the square packings cooperatively form prefect right angles at corners of contact surfaces within the cylinder to prevent internal leakage of fluid within the cylinder.

4 Claims, 7 Drawing Figures

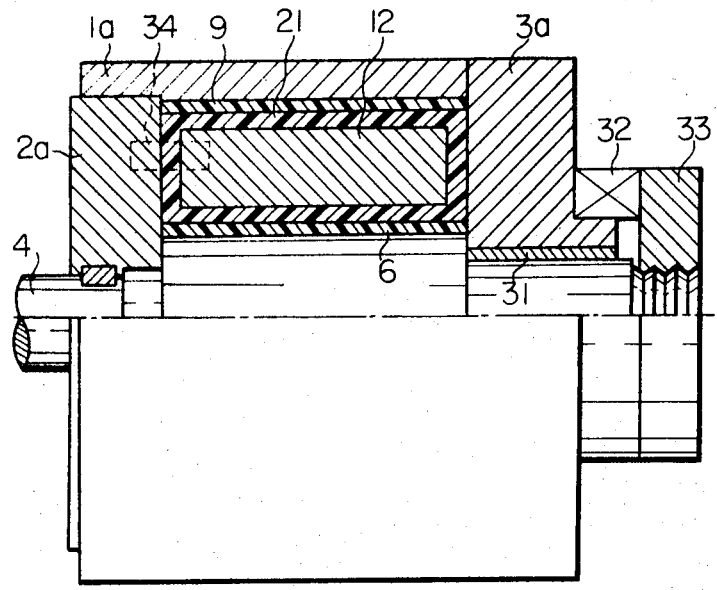
Fig. 6
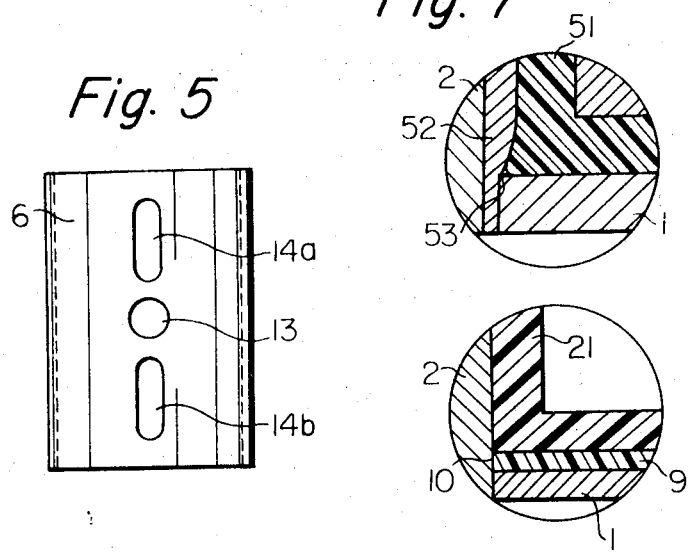
Fig. 5
Fig. 7

ROTARY ACTUATOR

The present invention relates to a vane-type actuator with square packings adapted for use as a power source in rotational movement with limited angle of rotation in industrial machinery in general and in opening and closing of butterfly valves.

Heretofore, in this type of rotary actuator, in order to prevent internal leakage of fluid within the cylinder, gaskets formed of, for example, synthetic rubber and the like, are provided between the cylinder and the covers. However, this known construction has a disadvantage that a small gap is made at the corner of contact surfaces thereby to allow the fluid within the cylinder to leak through the gap radially along the end face. Particularly in the construction wherein the end faces are entirely mounted by gaskets and fitted into the cylinder, since the gaskets are strongly compressed and deformed to hasten the wear thereof, it is relatively difficult to obtain such apparatus with good durability. On the other hand, a linear cylinder-type rotary actuator for translating linear movement into rotary movement, while providing high sealing characteristic, is of relatively complicated construction and expensive to manufacture.

Accordingly, it is an object of this invention to provide a vane-type rotary actuator which is structurally simple, easy to manufacture, and has high sealability and durability.

In order to achieve the above and other objects, the rotary actuator according to the present invention is structured by providing seal material made of, for example, synthetic resin, on the internal periphery of the cylinder and/or the external periphery of the shaft, and by axially compressing the seal material with the covers at both ends of the actuator and assembling thereinto.

The invention will be better understood from the following description taken in connection with the accompanying drawings in which:

FIG. 5 is a plan view of a seal material to be mounted on the shaft;

FIG. 6 is a partial sectional view of another embodiment of the present invention; and FIG. 7 presents a comparison between the internal corner of the rotary actuator according to the present invention and that of the known rotary actuator.

Figure 1:
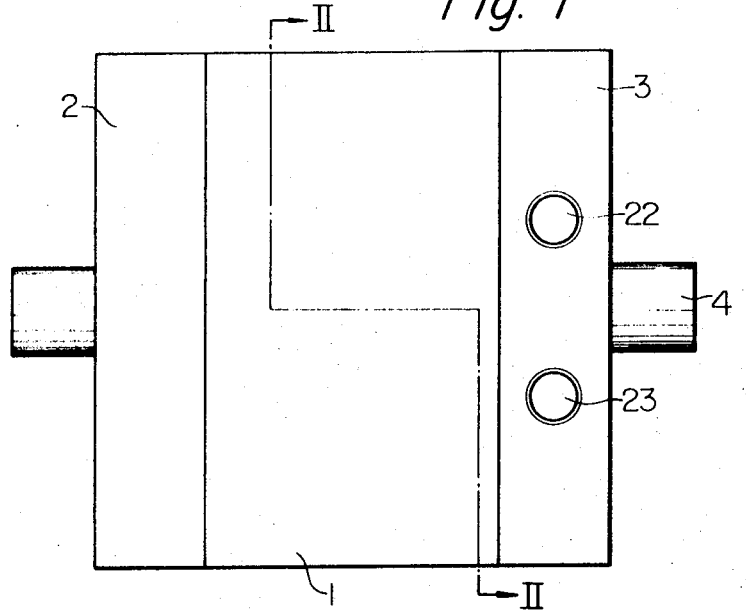
FIG. 1 is a front view of an embodiment of the rotary actuator according to the present invention.

Referring now to the drawings, there is shown an embodiment of the rotary actuator according to the present invention.

In FIGS. 1 to 4, a cylinder 1 of the rotary actuator houses a rotatable shaft 4 supported by left and right covers 2 and 3, and forms a pressure chamber 5 between the covers 2, 3 and the external periphery of the shaft 4. On the internal periphery of the cylinder 1 and/or the external periphery of the shaft 4 is mounted seal material 6 or 9 which is made of synthetic resin of such for example as fluorine resin having a low coefficient of friction and an appropriate elasticity and are machined so that the edges of both end faces are formed exactly. And the seal material 6 or 9 is axially compressed by the covers 2 and 3. The pressure chamber 5 of the cylinder 1 is sealed by pressing the end portions 7, 8 of the seal material 6 and/or the end portions 10, 11 of the seal material 9 against the end walls of the covers 2 and 3. In this embodiment, the seal material 6 or 9 is formed in an annular shape and, the seal material 6, for example, is provided with a tapped hole 13 and pin holes 14 a, 14b for mounting movable vane 12 on the shaft 4, as shown in FIG. 5.

Figure 2:
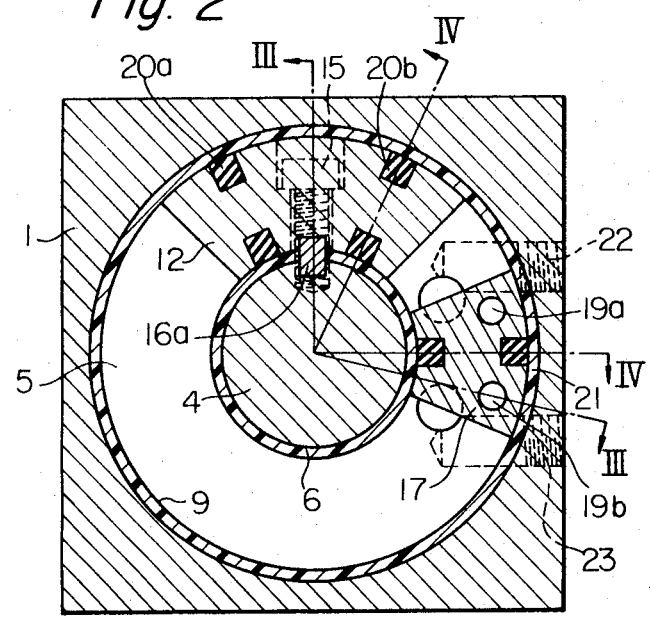
FIG. 2 is a sectional view taken along the line II—II of FIG. 1.
Figure 3:
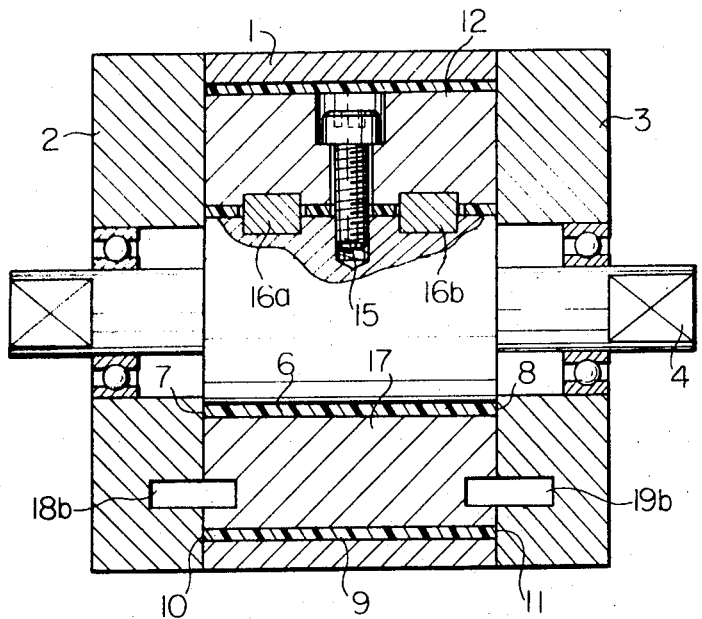
FIG. 3 is a sectional view taken along the line III—III of FIG. 2.
Figure 4:
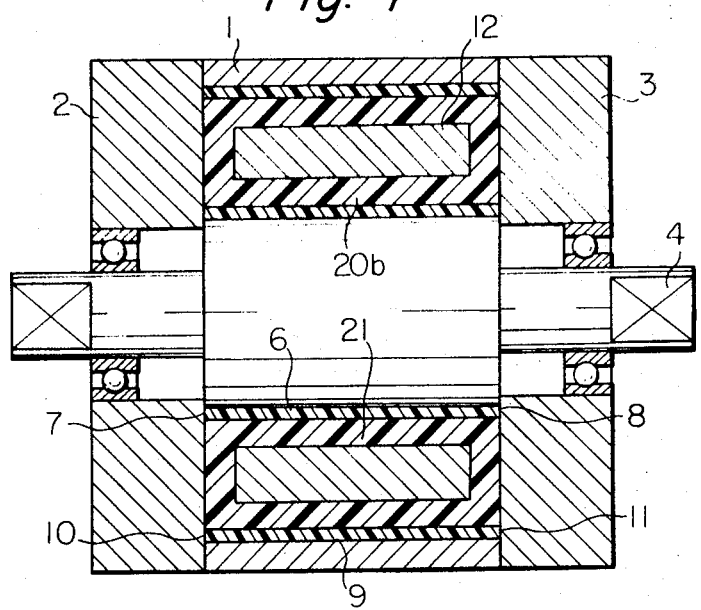
FIG. 4 is a sectional view taken along the line IV—IV of FIG. 2 showing the sealing relation between the seal materials and the square packings.

As illustrated in FIGS. 2 and 3, the movable vane 12 slidable within the pressure chamber 5 together with the seal material 6 is fixed on the shaft 4 by means of a bolt 15, pins 16a, and 16b so that the seal material 6 can be rotated together with the shaft 4 as the movable vane 12 rotates. On the contrary, stationary vane 17 is fixed to the right and left covers 2 and 3 of the rotary actuator by means of pins 18a, 18b, 19a and 19b (see FIG. 2). The movable vane 12 and the stationary vane 17 are provided with square packings 20a, 20b and 21 to prevent internal leakage of the fluid in the pressure chamber 5 so that the square packings provide sealing of the inside of the pressure chamber 5 integrally with the right angles respectively formed by the end portions 7, 8 of the seal material 6 and/or the end portions 10, 11 of the seal material 9.

The fluid supplied from the outside of the rotary actuator according to the present invention, as shown in FIG. 2, flows into the pressure chamber 5 through ports 22 or 23 to cause the movable vane 12 to slide and the seal material 6 and the shaft 4 to rotate within a prescribed range of angle.

As shown in FIG. 6, the shaft 4 is rotatably supported by a bearing 31 provided at the cover 3a and is fastened by a nut 33 through a thrust bearing 32. In this construction, elastic strain is produced in the seal materials 6 and/or 9 in axial and radial directions so as to provide complete sealing of the contact surfaces and the corners thereof.

Further, as shown in FIG. 6, the movable vane 12 is fixed to the cover 2a by means of a pin 34, and the cover 2a is fixed on the shaft 4. Accordingly, the movable vane 12, the cover 2a, and the shaft 4 rotate in one body within the cylinder 1a. Also in such a construction, the seal materials 6 and/or 9 can be pressed against the contact surface so as to provide complete sealing of the contact surfaces and the corner thereof.

The same effect can be achieved by providing a sheet material instead of the annular seal material 6 or 9 on the internal periphery of the cylinder 1 or the external periphery of the shaft 4 and securing the sheet material thereon by suitable means.

As described above, the rotary actuator according to the present invention can be sealed by constantly compressing axially the seal materials 6 and/or 9 mounted on the internal periphery of the cylinder 1 and/or the external periphery of the shaft 4 by means of the covers 2 and 3 of the rotary actuator and by pressing the end portions 7, 8 of the seal material 6 and/or the end portions 10, 11 of the seal material 9 against the end faces of the covers 2 and 3.

As shown in the upper drawing of FIG. 7, in the known type of rotary actuator utilizing a square packing 51 and a gasket 52, a gap 53 tends to occur at the corner portion which has a serious working problem concerning sealability. However, in the present invention, since a right angle is formed by the end portions 6, 7 of the seal material 6 and/or the end portions 10, 11 of the seal material 9 (see the lower drawing of FIG. 7) to produce a sealing effect within the pressure chamber 5 in combination with the right angle formed by the square packings 20a, 20b, and 21, it can improve the sealability relative to the fluid tending to leak in circumferential direction along the end faces of the covers 2 and 3 of the rotary actuator. Since the sliding surfaces of the covers 2, 3 and the sealing material 6 which rotates together with the shaft 4 and the movable vane 12 slide in surface-to-surface contact with one another, the seal material will not be defomed and, accordingly, the sealability in the pressure chamber 5 will not be lowered. Further, since the seal materials 6 and/or 9 are compressed axially by the covers 2 and 3, uniform elastic strain is produced throughout the overall length of the seal materials 6 and/or 9, even when the end faces of the covers 2 and 3 are worn by sliding of the end portions 7 and 8 of the seal material 6, the end portions 7 and 8 of the seal material 6 slide axially according to the degree of the wear to compensate for the worn portion, whereby durability of the rotary actuator can be improved. Durability of the apparatus can be improved also by the fact that no seam is formed on the linear portions where the seal materials 6 and/or 9 contact the square packings 20a, 20b, and 21.

Since the seal materials 6 and/or 9 are compressed axially by the covers 2 and 3 and upon application of fluid pressure said materials are tightly pressed against the internal periphery of the cylinder 1 and the external periphery of the shaft 4 respectively, the rotary actuator according to the present invention has an advantage that no particularly high accuracy is required in sealability upon manufacture of other components of the actuator, for example, the portions whereat the cylinder 1 is in contact with the covers 2 and 3.

Being constructed as described above, the rotary actuator according to the present invention is capable of providing excellent sealability comparable to that of the cylinder peripheral seal utilizing O-ring and is adaptable for use with the applications to which the known vane-type rotary actuator cannot be used because of the amount of the internal leakage, for example, automatic control of ball valves.

What we claim is:

1. A rotary actuator which comprises in combination, a cylinder, end covers disposed on opposite open portions of said cylinder, a rotary shaft supported by said end covers and disposed through said cylinder, a stationary vane and a movable vane disposed relative said shaft and within the cylinder, seal material composed of synthetic resin and mounted on the inner periphery of said cylinder and on the external periphery of said shaft, said seal material having a normal length a little greater than that of said cylinder and having squared edge portions, said seal material being compressed in the axial direction by the end covers, and square packings disposed on said stationary vane and said movable vane.

2. A rotary actuator as set forth in claim 1, wherein the seal materials to be mounted on the external periphery of said shaft are formed in an annular shape and are provided with holes in the axial direction for fixing said movable vane to said shaft.

3. A rotary actuator as set forth in claim 1, wherein one of said covers is fixed to said shaft, the movable vane is fixed to said one cover, a thrust bearing is mounted to the outside of the other cover, and said other cover is fastened axially through said thrust bearing by means of a nut threadably engaging with said shaft.

4. A rotary actuator as set forth in claim 1, wherein one of said covers is fixed to said shaft, the movable vane is fixed to said one cover, a thrust bearing is mounted to the outside of the other cover, and said other cover is fastened axially through said thrust bearing by means of a nut threadably engaging with said shaft.

* * * * *